United States Patent [19]

Todd et al.

[11] Patent Number: 5,065,067

[45] Date of Patent: Nov. 12, 1991

[54] PIEZOELECTRIC CIRCUIT

[76] Inventors: Philip A. Todd, 11456 Dumbarton Dr., Dallas, Tex. 75228; Bobby R. Walker, 1300 Lansdowne Dr., Arlington, Tex. 76012

[21] Appl. No.: 350,766

[22] Filed: May 12, 1989

Related U.S. Application Data

[63] Continuation-in-part of Ser. No. 241,882, Sep. 8, 1988, Pat. No. 4,943,752.

[51] Int. Cl.⁵ .......................................... H01L 41/08
[52] U.S. Cl. ................................... 310/339; 310/319
[58] Field of Search ................. 310/338, 339, 316–319

[56] References Cited

U.S. PATENT DOCUMENTS

| | | | |
|---|---|---|---|
| 1,190,308 | 7/1916 | Levy | 324/537 |
| 3,040,243 | 6/1962 | Weiss | 324/414 |
| 3,063,006 | 11/1962 | Steinberger | 324/555 |
| 3,068,460 | 12/1962 | Uhrig | 324/555 |
| 3,211,069 | 10/1965 | Rixton | 310/339 X |
| 3,214,689 | 10/1965 | Outen | 324/51 |
| 3,363,139 | 1/1968 | Schiavone | 310/339 X |
| 3,425,049 | 1/1969 | Robinson | 324/556 |
| 3,639,788 | 2/1972 | Horan | 310/339 X |
| 3,712,197 | 1/1973 | Wagner | 310/339 X |
| 3,725,780 | 4/1973 | Olin | 324/414 |
| 3,760,266 | 9/1973 | Ocasio | 324/414 |
| 3,782,258 | 1/1974 | Boekkooi | 95/11.5 |
| 3,808,418 | 4/1974 | Conard | 240/10 |
| 3,880,572 | 4/1975 | Haugsjaa et al. | 310/339 X |
| 4,025,817 | 5/1977 | Wollachleger | 315/241 |
| 4,256,991 | 3/1981 | Otala | 310/339 X |
| 4,523,261 | 6/1985 | West | 362/192 |
| 4,595,864 | 6/1986 | Stiefelmeyer | 315/248 |
| 4,748,366 | 5/1988 | Taylor | 310/328 |

FOREIGN PATENT DOCUMENTS 1306756  9/1962  France ............................. 310/339

Primary Examiner—Mark O. Budd
Attorney, Agent, or Firm—Richards, Medlock & Andrews

[57] ABSTRACT

A piezoelectric circuit (10, 70, 100) is provided, which can be employed in a wide variety of applications. The circuit (10) can be used to test the bulbs in a string (14) of Christmas tree lights and, in a modified circuit (200) can use any suitable high voltage source (202) as a substitute for the piezoelectric crystal. In another circuit (100) a capacitor (72) is used to store electrical power to light a light source (19) for a period of time after the piezoelectric crystal is struck. The circuit (100) can be mounted in a shoe (64), fishing lure (46), toy (56), or any other suitable application to light a light source (19). In another circuit (70) by positioning a capacitor (72) in parallel with the rectified output of crystal (16) and light source (62), and positioning a normally open switch (74) between the capacitor and light source, the capacitor can be charged by repeated striking of the crystal. For light sources (62) that require a trigger voltage, a normally open switch (75) is mounted between the crystal (16) and the light source trigger contact (120). The circuit (70) can be used in the pedal (30) of a bicycle to generate a flashing light easily visible at night. The circuit (70) can also be mounted in a camera (90) or emergency light (36) or any other suitable application.

4 Claims, 4 Drawing Sheets

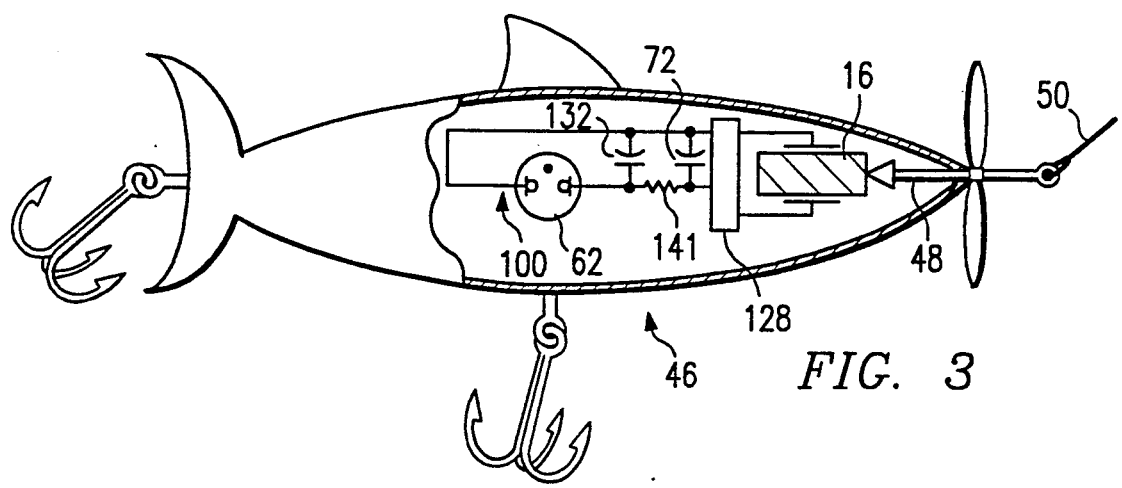
FIG. 3
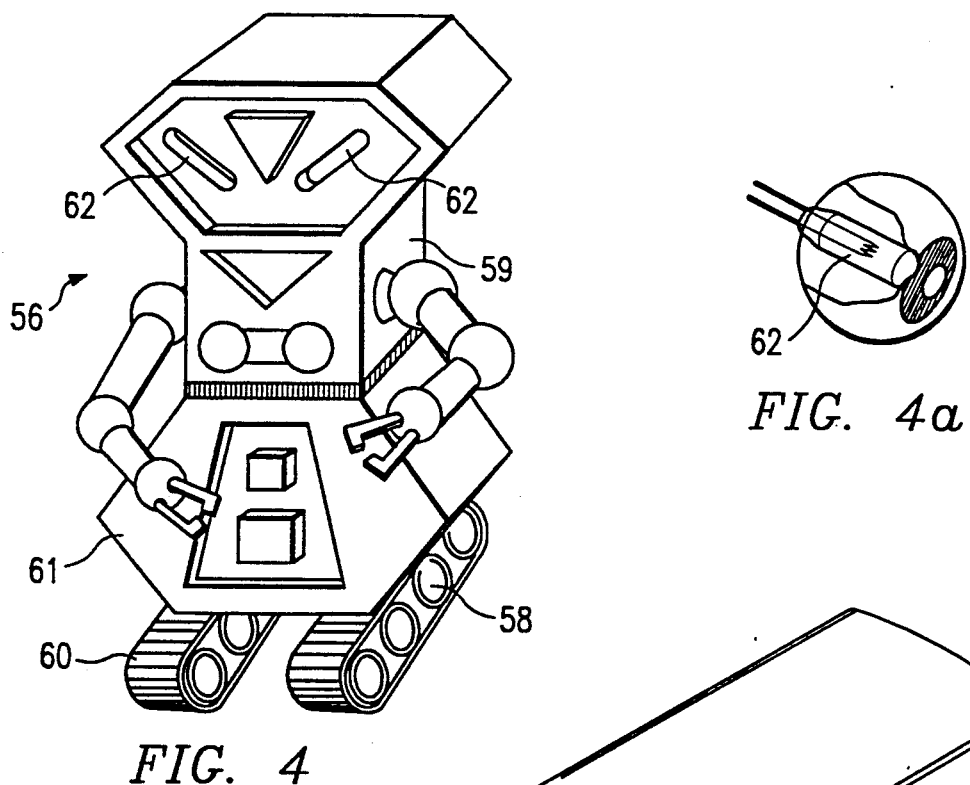
FIG. 4
FIG. 4a
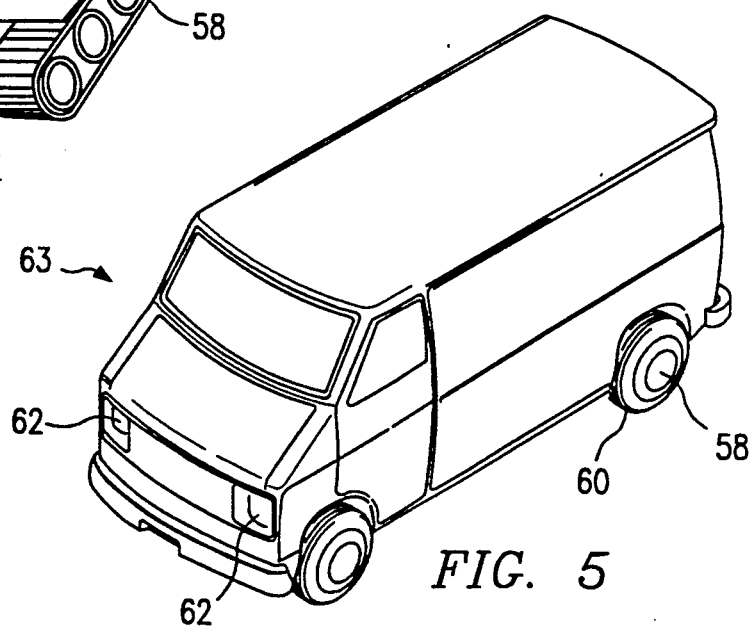
FIG. 5 ll# PIEZOELECTRIC CIRCUIT

CROSS REFERENCE TO RELATED APPLICATION

This application is a continuation-in-part of co-pending application for U.S. Ser. No. 241,882 filed Sept. 8, 1988, now U.S. Pat. No. 4,943,752 issued July 24, 1990.

TECHNICAL FIELD

This invention relates to applications for a piezoelectric crystal.

BACKGROUND OF THE INVENTION

The basic phenomena of a piezoelectric crystal is well known. If a crystal is struck, or exposed to a sudden shock, the crystal will generate electrical potential of relatively high voltage. This phenomena has been applied in industry as, for example, a voltage test device disclosed in U.S. Pat. No. 3,425,049 to Robinson. Other means of testing lamp circuits have been disclosed in U.S. Pat. No. 3,760,266 to Ocasio and U.S. Pat. No. 1,190,308 to Levy. The phenomena of a piezoelectric crystal has also been applied for powering light sources such as disclosed in U.S. Pat. No. 3,808,418 to Conard, U.S. Pat. No. 4,523,261 to West, U.S. Pat. No. 4,748,366 to Taylor, U.S. Pat. No. 4,595,864 to Stiefelmeyer, U.S. Pat. No. 3,782,258 to Boekkool and U.S. Pat. No. 4,025,817 to Wollachleger. However, the art has not fully appreciated the advantages of the piezoelectric crystal and its applications.

SUMMARY OF THE INVENTION

In accordance with one aspect of the present invention, a piezoelectric circuit is provided which includes a piezoelectric crystal, electrically activated light source, and a structure for electrically connecting the piezoelectric crystal to the light source to conduct a voltage generated at the piezoelectric crystal to the light source.

The various applications of this circuit can, for example, include a check for burned out bulbs in a Christmas tree light string by inducing a voltage across the bulbs. The burned out bulb will have a gap in its filament, across which an arc will jump to generate a flash, indicating a burned out bulb.

In accordance with another aspect of the present invention, the piezoelectric circuit includes a rectifier, a capacitor which is connected in parallel between the rectified output of the piezoelectric crystal, another capacitor, a resistor and a light source such as, for example, a gas filled discharge tube. When the piezoelectric crystal is activated, the rectifier converts the alternating current produced by the piezoelectric crystal into direct current which charges a capacitor. The charged capacitor and the piezoelectric crystal both provide electrical power to the resistor and other capacitor, which are connected to the light source which illuminates when the piezoelectric crystal is activated. After the piezoelectric crystal is deactivated, the capacitor, which has been charged by the piezoelectric crystal and rectifier, will continue to provide electrical power to the resistor, other capacitor and light source, which will continue to illuminate for a period of time. Such a circuit would have applications in, for example, a fishing lure or toy, activated by movement of the lure or toy, or any other suitable application.

In accordance with another aspect of the present invention, the piezoelectric circuit includes a rectifier and a capacitor which is connected in parallel between the rectified output of the piezoelectric crystal and the light source. A normally open switch isolates the light source from the capacitor and the piezoelectric crystal so that repeated activation of the piezoelectric crystal charges the capacitor to a predetermined level. The switch can then be closed to activate the lamp. For gas filled discharge tube light sources which require a trigger voltage to initiate ionization of the gas, another normally open switch connects the piezoelectric crystal to the trigger connection of the light source. When the piezoelectric crystal is activated and the trigger voltage control switch is closed, the charged capacitor discharges through the light source and produces much greater illumination than the illumination which results from connecting a light source directly to a piezoelectric crystal. Such a circuit would have applications in, for example, the flash of a camera, a flashing light on a bicycle activated by rotation of the bicycle pedal, and an emergency signal light.

BRIEF DESCRIPTION OF THE DRAWINGS

For a more complete understanding of the present invention, and for further advantages thereof, reference is now made to the following Detailed Description taken in conjunction with the accompanying drawings, wherein;

FIG. 3 illustrates a fishing lure using a piezoelectric circuit;

FIGS. 4 and 5 illustrate toys using a piezoelectric circuit;

FIG. 4A illustrates a bulb used in the toy to imitate an eye;

DETAILED DESCRIPTION

Figure 1:
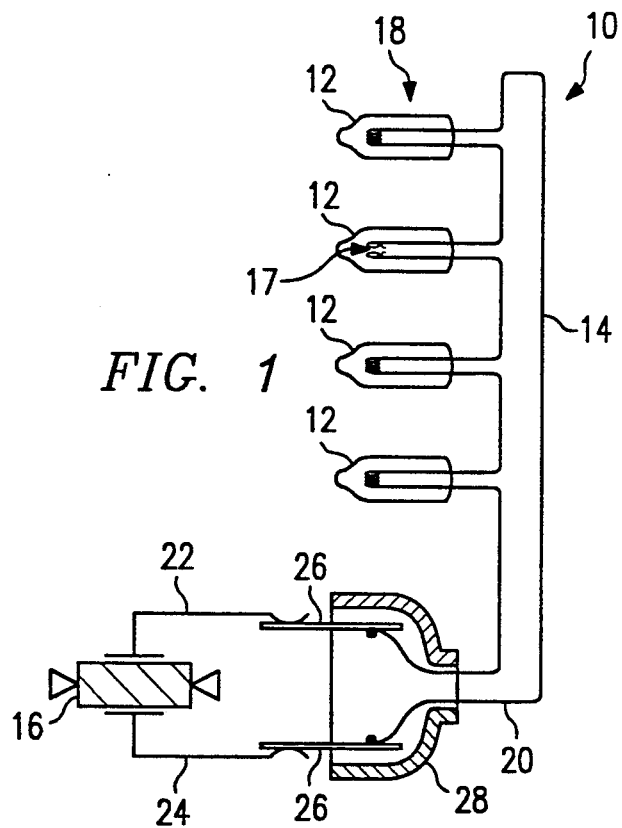
FIG. 1 illustrates a piezoelectric circuit used for a Christmas tree light tester forming a first embodiment of the present invention.
Figure 1A:
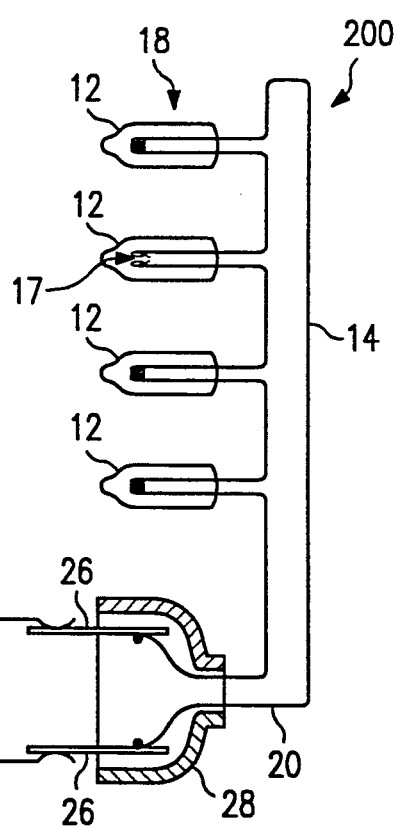
FIG. 1A illustrates a Christmas light tester using an alternate high voltage source.

With reference now to the accompanying drawings, and more specifically to FIGS. 1 and 1A, applications of piezoelectric circuits 10 and alternate power source circuit 200 are illustrated which incorporate the basic circuit 10, as best illustrated in FIG. 1 or the basic circuit 200 as best illustrated in FIG. 1A.

FIG. 1 illustrates an application of the piezoelectric circuit 10 in checking bulbs 12 within a string 14 of Christmas lights. The piezoelectric crystal 16, which, when struck by an object or otherwise subjected to a sudden impact, generates an electrical potential of relatively high voltage. The circuit further includes electrically activated light source 18, which in the embodiment of FIG. 1, comprises the bulbs 12 within the string 14. Further, the circuit 10 includes suitable electrical conductors 20 to electrically connect the crystal 16 with the light source 18. In the embodiment of FIG. 1, leads 22 and 24 extend from the crystal 16 to be connected to the prongs 26 of the plug 28 forming part of the string 14.

If the string 14 no longer works because one of the bulbs has burned out, the leads 22 and 24 are connected to the plug 28 to complete the piezoelectric circuit 10. A voltage is then generated by crystal 16 by striking the crystal. For example, the piezoelectric crystal and striking element can be of the types commonly provided in butane cigarette lighters, cooking grills for igniting the gas or other similar devices which contain multiple piezoelectric crystals and striking elements. The high voltage generated will cause a small current to flow through the circuit. Where the filaments of bulbs 12 are complete, the small current will simply flow through the filament without generating a visual signal. However, if a filament in a particular bulb is broken, a gap 17 will exist between the ends of the filament and the current flow will cause a readily visible arc across the gap 17 due to the relatively high voltage generated by the crystal 16. This clearly identifies the burned out bulb or bulbs for replacement.

FIG. 1A illustrates a circuit 200 which is also used to check bulbs 12 within a string 14 of Christmas lights which employs a source of high voltage other than a piezoelectric source. The source 202 can, for example, be a static generator, such as a Van de Graaf generator or a Wimshurst machine, a magnetic generator, such as any coil of wire being cut by magnetic lines of force, an electronic circuit, such as an A.C. or D.C. powered blocking oscillator or a step up transformer, such as a high voltage step up transformer powered from an A.C. line.

Figure 2:
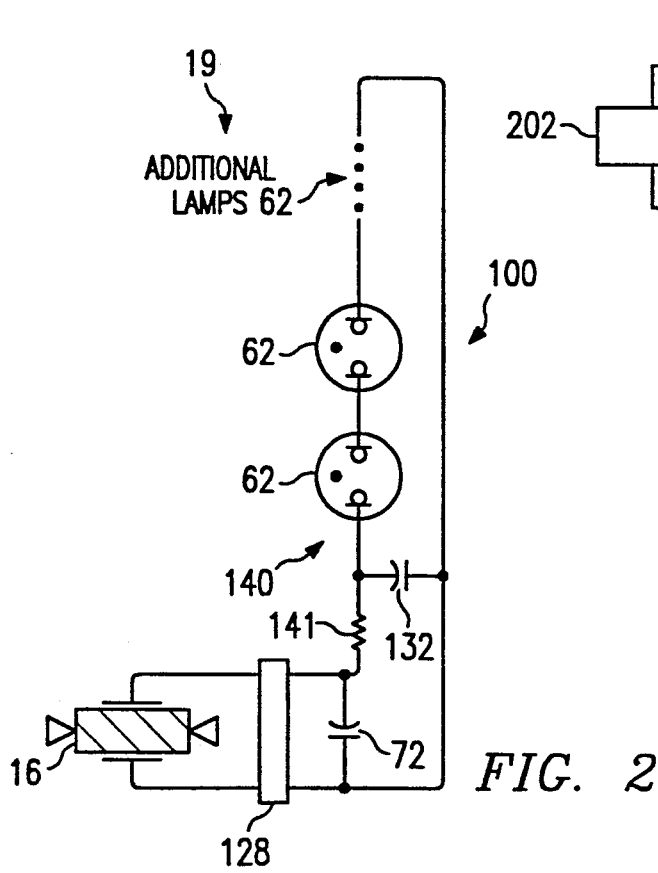
FIG. 2 illustrates a schematic of another embodiment of the present invention incorporating a rectifier, a resistor, two capacitors, and light sources.

With reference now to FIG. 2, a circuit 100 is illustrated forming a second embodiment of the present invention. Circuit 100 uses a piezoelectric crystal 16 to charge the capacitor 72 through rectifier 128 and to electrically activate light sources 19 through conductors 140 and the resistor 141 and capacitor 132. In the embodiment of FIG. 2, the light sources 19 comprise bulbs 62. The bulbs 62 are gas filled discharge tubes, filled with gases such as neon, argon or xenon, which, when ionized by an electrical potential such as that produced by piezoelectric crystals 16, emits light. One device constructed in accordance with the teachings of the present invention, as for example, contains a capacitor 72 having a value of 0.2 microfarads and 400 volts D.C., a resistor 141 having a value of 1 megaohm and a capacitor 132 having a value of 0.01 microfarads and 100 volts D.C. With these values, the period of continued operation, after the piezoelectric crystal is deactivated, is approximately 15 seconds and the flash rate is approximately once per second. When the values of capacitor 72, resistor 141 and capacitor 132 are changed, greater or shorter operating periods and flash rates occur. In piezoelectric circuits where the light source is connected directly to the piezoelectric crystal, the light source emits light only when the crystal is activated. Embodiment of the rectifier 128, capacitor 72, resistor 141 and capacitor 132 in a piezoelectric circuit of the present invention provides the advantage of continued illumination of the light sources after the piezoelectric crystal is deactivated.

With reference now to FIG. 3, the piezoelectric circuit 100 is incorporated for use within a fishing lure 46. Preferably, the striker 48 is positioned between the fishing line 50 and the remainder of the lure 46 so that jerks on the line cause the striker to impact the crystal 16 to light the light source 62 in a random manner to attract fish.

With reference now to FIGS. 4 and 5, the piezoelectric circuit 100 is illustrated used within a toy 56. The striker 58 is mounted within the wheels or tracks 60 of the toy so that when a child pushes the toy, the striker 58 impacts the crystal to light the light source 62 forming the eyes of the toy. Of course, the striker could be positioned elsewhere within a toy, as for operation when the child rotates the upper body 59 of the toy relative to the lower body 61 of the toy. Further, the configuration of the toy could vary, and, for example, could be a conventional truck 63 with the same circuit as seen in FIG. 2.

Figure 6:
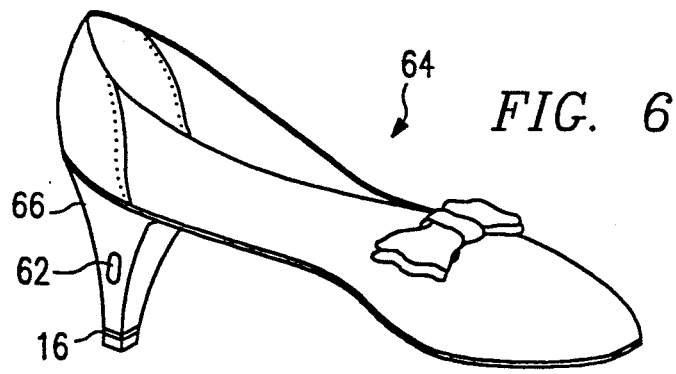
FIG. 6 illustrates a shoe using a piezoelectric circuit.

With reference now to FIG. 6, a shoe 64 incorporates a piezoelectric circuit 100 as a novelty. The Crystal 16 is mounted in the heel 66 of the shoe 64. When the heel 66 impacts the ground, it causes a striker to impact the piezolectric crystal 16 to generate a signal to light bulb 62 within the heel for a novelty effect. Such a design could also be a safety feature in any type of shoe when walking or jogging, particularly at night.

Figure 7:
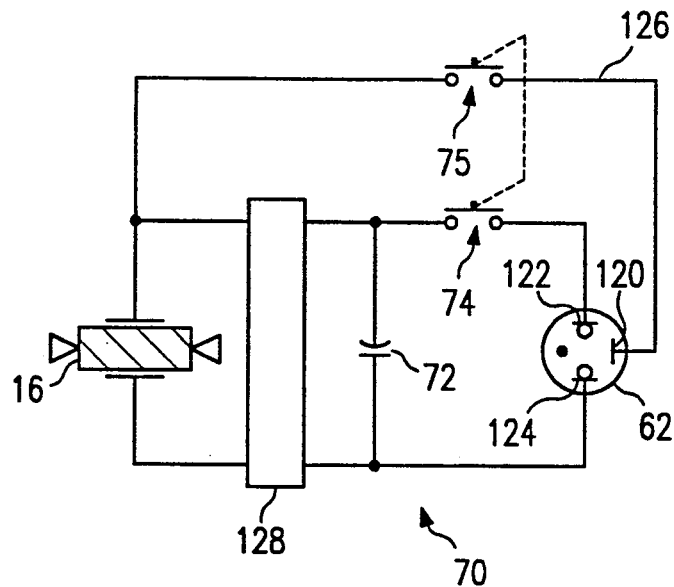
FIG. 7 illustrates a schematic of another embodiment of the present invention incorporating a rectifier, a storage capacitor, switches and a light source.

FIG. 7 illustrates circuit 70 forming a third embodiment of the present invention. Circuit 70 incorporates a rectifier 128, and a capacitor 72 which is mounted in parallel between the rectified output of the piezoelectric crystal 16 and the electrically activated light source 62. Further, a normally open switch 74 is mounted between the capacitor 72 and the light source 62. In circuit 70, the crystal 16 will be struck repeatedly with switch 74 open to charge capacitor 72. When the capacitor 72 is charged, closure of switch 74 will discharge the capacitor 72 across the light source 62. When a light source 62 such as a xenon flash tube is used, a trigger voltage may be required to plate 120 to initiate ionization of the gas between contacts 122 and 124. The trigger voltage can be supplied directly from crystal 16 through conductor 126 containing a normally open switch 75.

After sufficient charge has built up in capacitor 72 by repeated striking of crystal 16, the closure of both switches 74 and 75, and the striking of crystal 16 to generate the trigger voltage, results in lighting source 62. One device constructed in accordance with the teachings of the present invention as for example, contains a capacitor 72 having a value of 0.2 microfarads and 400 volts D.C. and a light source 62 such as, for example, a xenon flash tube of the type found in a small camera. When the light source 62 is activated by the capacitor 72 through switch 74 and the piezoelectric crystal 16 provides the trigger voltage through switch 75, the light output is comparable to that provided by conventional battery powered circuits and is much greater than the illumination which results from other circuits which merely connect a light source directly to a piezoelectric crystal.

Use of the circuit 70 thus permits a light source 62 to be used which could not be operated efficiently by the voltage and current flow generated by a single strike on the crystal 16 as in circuits 10 or 100.

Figure 8:
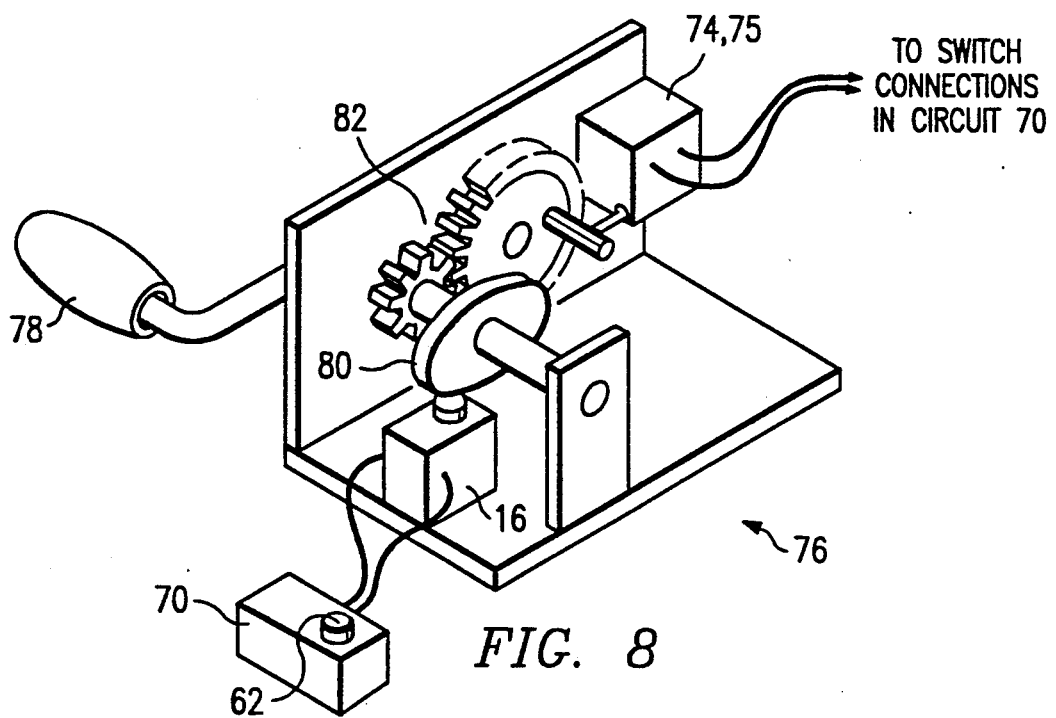
FIG. 8 illustrates a crank mechanism for operating the circuit of FIG. 7.

FIG. 8 illustrates an application of circuit 70 within a manually operated crank assembly 76. A handle 78 is rotated to simultaneously rotate a cam 80 to activate an impacting device to strike a crystal 16 repeatedly and to rotate gear assembly 82. Gear assembly 82 closes switches 74 and 75 at the proper time to cause the light source 62 to flash.

Figure 9:
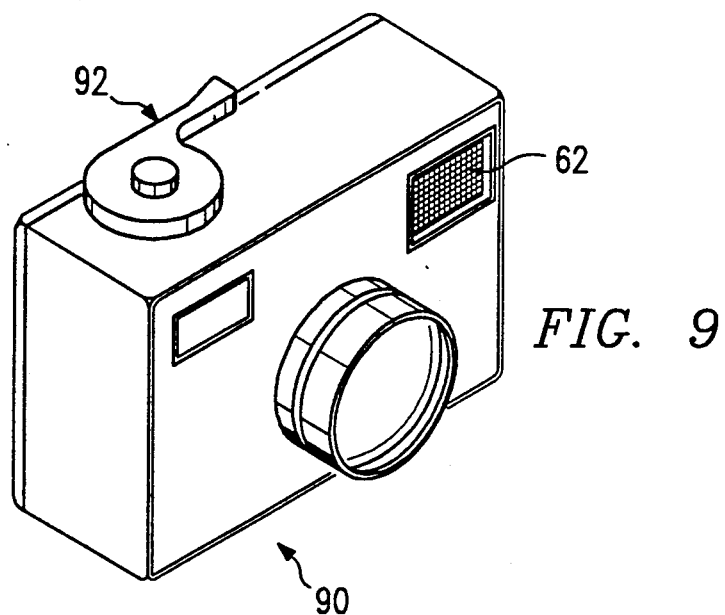
FIG. 9 illustrates a camera incorporating the circuit of FIG. 7 to operate the flash.

FIG. 9 illustrates an application of circuit 70 within a camera 90. The crystal striker forms a part of the conventional winding lever 92 so that, as the film is wound, a series of strikes on the piezoelectric crystal generates sufficient charge stored in capacitor 72 to operate the flash 62 of the camera.

Figure 10:
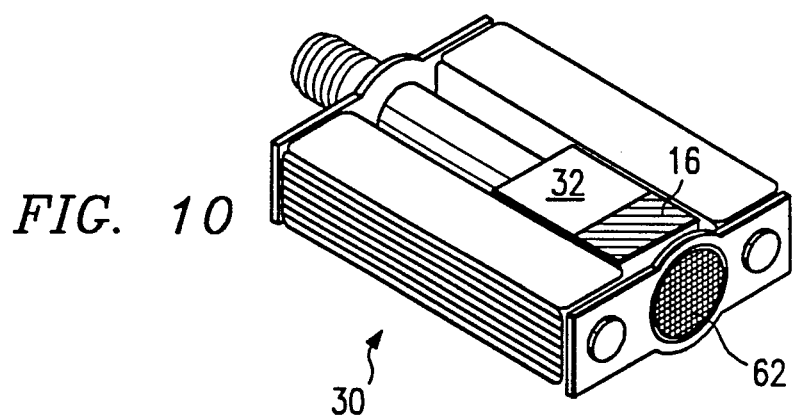
FIG. 10 illustrates a piezoelectric circuit in a bike pedal.

With reference now to FIG. 10, a different application of the piezoelectric circuit 70 is illustrated by use in a bicycle pedal 30. The pedal 30 is mounted for pivotal motion on a horizontal shaft forming part of the main drive gear of the bicycle. A piezoelectric crystal 16 is mounted in the pedal and a striking element 32 is mounted on the shaft to impact the crystal as the pedal rotates about the shaft. This motion generates a series of voltage pulses from the crystal 16 which are effective to provide power to bulb 62 at the end of the pedal 30 to provide a flashing signal. The signal is a significant safety advantage, as well as being an interesting novelty. The flashing light would be a very significant safety factor when the bicycle was ridden at night.

Figure 11:
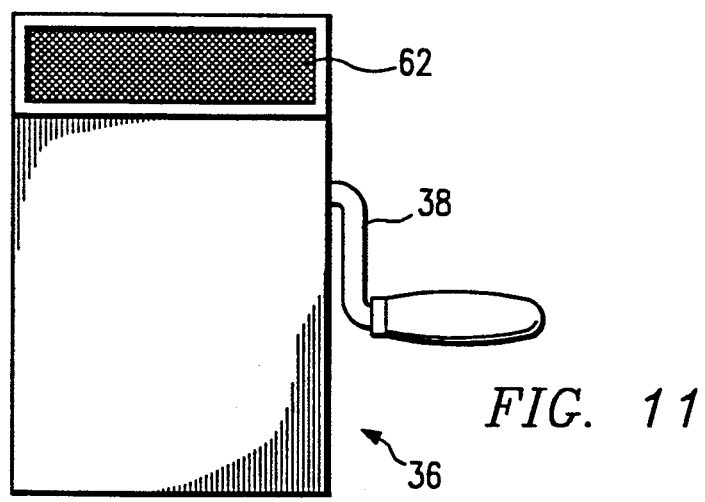
FIG. 11 illustrates an emergency light signal using a piezoelectric circuit.

With reference now to FIG. 11, another application of piezoelectric circuit 70 is illustrated in an emergency light 36. A piezoelectric crystal 16 is mounted in the light 36 for manual activation by a striker 38 such as illustrated in FIG. 8. As the crystal is struck, the charge in capacitor 72 builds up until switches 74 and 75 close to cause bulb 62 in the emergency light to flash. Because the emergency light 36 requires no internal or external power sources such as batteries, the light can be stored for lengthy periods of time without concern as to its reliability when needed.

Although several embodiments of the invention have been illustrated in the accompanying drawings and described in the foregoing Detailed Description, it will be understood that the invention is not limited to the embodiments disclosed, but is capable of numerous rearrangements, modifications and substitutions of parts and elements without departing from the scope and spirit of the invention.

We claim:
1. A piezoelectric circuit, comprising:
a piezoelectric crystal;
an electrically operated gas filled discharge tube light source;
means for electrically connecting the piezoelectric crystal to the light source to conduct a voltage generated at the piezoelectric crystal to the light source;
a rectifier connected to the piezoelectric crystal;
a capacitor mounted in parallel with the rectified output of the piezoelectric crystal and light source, repeated impact on the piezoelectric crystal charging the capacitor;
a first normally open switch between the capacitor and light source, closing the switch connects the charged capacitor in parallel with the light source, causing the light source to flash; and
a second normally open switch connected between the piezoelectric crystal and the trigger contact on the gas filled discharge tube light source, closing the switch and striking the crystal initiates ionization of the gas and permits rapid discharge of the capacitor through the light source, causing it to flash.

2. The piezoelectric circuit of claim 1 wherein the piezoelectric crystal and light source are mounted on the pedal of a bicycle, a striker mounted in the bicycle pedal for striking the piezoelectric crystal as the pedal rotates to induce a flashing light signal from the light source.

3. The piezoelectric circuit of claim 1 mounted in a emergency signal light, the emergency signal light further having a striker for manually striking the piezoelectric crystal to illuminate the light source.

4. The piezoelectric circuit fo claim 1 used in a camera having a flash, the light source forming the flash, the camera having a striker for repeatedly striking the piezoelectric crystal to charge the capacitor, the normally open switches being closed upon activating a shutter operation button on the camera.

* * * * *